US012656199B2

(12) United States Patent　　(10) Patent No.: US 12,656,199 B2
Molinazzi et al.　　(45) Date of Patent: Jun. 16, 2026

(54) CREEP/DEFORMATION COMPENSATION FOR SENSORS

(71) Applicant: EZMEMS LTD., Caesarea (IL)

(72) Inventors: Nicola Molinazzi, Kfar Sava (IL); Tsvi Shmilovich, Pardes Hanna-Karkur (IL); Mark Kantor, Ness Ziona (IL)

(73) Assignee: EZMEMS LTD., Caesarea (IL)

( * ) Notice: Subject to any disclaimer, the term of this patent is extended or adjusted under 35 U.S.C. 154(b) by 384 days.

(21) Appl. No.: 18/565,477

(22) PCT Filed: May 30, 2022

(86) PCT No.: PCT/IL2022/050576
§ 371 (c)(1),
(2) Date: Nov. 29, 2023

(87) PCT Pub. No.: WO2022/254431
PCT Pub. Date: Dec. 8, 2022

(65) Prior Publication Data
US 2024/0255372 A1　　Aug. 1, 2024

Related U.S. Application Data

(60) Provisional application No. 63/195,019, filed on May 30, 2021.

(51) Int. Cl.
*G01L 19/00*　　(2006.01)
*G01L 13/02*　　(2006.01)
*G01L 19/08*　　(2006.01)

(52) U.S. Cl.
CPC ............ *G01L 13/026* (2013.01); *G01L 19/00* (2013.01); *G01L 19/086* (2013.01)

(58) Field of Classification Search
CPC . G01L 19/147; G01L 9/0072; G01L 19/0645; G01L 19/0084; G01L 13/025;
(Continued)

(56) References Cited

U.S. PATENT DOCUMENTS 4,691,573 A　　9/1987　Varnum et al.
8,567,506 B2 *　10/2013　Vick, Jr. ............... E21B 47/017
　　　　　　　166/324
(Continued)

FOREIGN PATENT DOCUMENTS

FR　　　　3075369　　　6/2019
WO　　　18025264　　　2/2018
(Continued)

OTHER PUBLICATIONS

1 Extended European Search Report dated Feb. 17, 2025 as received in Application No. 22815497.7.

*Primary Examiner* — Andre J Allen

(74) *Attorney, Agent, or Firm* — Maschoff Brennan

(57) ABSTRACT

A sensor device comprising at least one sensor element and a sealed fluid cell having a compensation portion and a measurement portion coupled to the at least one sensor element. The sensor device is configured such that the compensation and measurement portions deform in response to externally applied fluid pressure to thereby change internal pressure conditions inside the sealed fluid cell and cause the measurement portion to experience differential pressure conditions of corresponding to the external and internal pressures.

20 Claims, 5 Drawing Sheets

(58) Field of Classification Search
CPC ............... G01L 19/0007; G01L 9/0042; G01L
19/0038; G01L 9/0073; G01L 9/0075;
G01L 9/0054; G01L 9/0055; G01L 19/04;
G01L 7/00; G01L 7/04; G01L 19/148;
G01L 19/14; G01L 19/143; G01L 17/00;
G01L 7/18; G01L 19/0092; G01L 15/00;
G01L 9/0051; G01L 7/041; G01L 9/12;
G01L 9/065; G01L 19/0618; G01L
9/0052; G01L 9/125; G01L 7/16; G01L
19/0609; G01L 19/003; G01L 9/007;
G01L 19/0627; G01L 19/0046; G01L
9/0022; G01L 9/06; G01L 19/0636; G01L
7/084; G01L 13/02; G01L 19/0023; G01L
19/142; G01L 7/043; G01L 19/08; G01L
9/0002; G01L 19/02; G01L 9/008; G01L
19/141; G01L 9/006; G01L 11/02; G01L
19/0672; G01L 23/10; G01L 23/18; G01L
19/0681; G01L 9/0077; G01L 19/12;
G01L 27/005; G01L 7/082; G01L 9/0044;
G01L 19/0015; G01L 19/0069; G01L
7/063; G01L 9/0001; G01L 19/146; G01L
21/12; G01L 27/002; G01L 27/007; G01L
9/16; G01L 11/00; G01L 19/00; G01L
9/0026; G01L 9/0089; G01L 9/045; G01L
9/14; G01L 19/0654; G01L 1/2281; G01L
11/025; G01L 13/026; G01L 11/008;
G01L 7/22; G01L 13/00; G01L 9/0047;
G01L 7/08; G01L 9/0076; G01L 9/0025;
G01L 9/0035; G01L 19/0061; G01L
9/0005; G01L 9/0041; G01L 9/0019;
G01L 9/08; G01L 9/10; G01L 21/00;
G01L 9/04; G01L 11/006; G01L 19/086;
G01L 9/00; G01L 9/0008; G01L 1/18;
G01L 11/004; G01L 19/069; G01L
9/0057; G01L 19/083; G01L 19/06; G01L
19/10; G01L 19/16; G01L 9/0016; G01L
13/023; G01L 7/048; G01L 9/0048; G01L
9/0027; G01L 9/0086; G01L 9/0079;
G01L 11/04; G01L 1/20; G01L 9/0091;
G01L 27/00; G01L 11/002; G01L 23/24;
G01L 7/182; G01L 1/02; G01L 19/0663;
G01L 7/166; G01L 23/22; G01L 9/0036;
G01L 9/0061; G01L 9/0039; G01L
23/125; G01L 19/145; G01L 9/0013;
G01L 21/04; G01L 9/0045; G01L 9/0092;
G01L 1/142; G01L 7/104; G01L 9/0033;
G01L 9/0083; G01L 9/0098; G01L
1/2293; G01L 7/24; G01L 9/02; G01L
21/22; G01L 9/0029; G01L 7/022; G01L
1/205; G01L 9/0064; G01L 23/08; G01L
5/14; G01L 13/06; G01L 23/16; G01L
7/088; G01L 7/163; G01L 9/0007; G01L
23/222; G01L 1/16; G01L 1/2287; G01L
9/0085; G01L 9/025; G01L 1/2212; G01L
21/14; G01L 9/0004; G01L 23/02; G01L
9/003; G01L 9/085; G01L 1/14; G01L
1/148; G01L 9/0058; G01L 9/105; G01L
7/02; G01L 7/061; G01L 9/002; G01L
1/2231; G01L 13/028; G01L 9/0095;
G01L 23/28; G01L 1/162; G01L 19/0076;
G01L 7/12; G01L 9/0038; G01L 9/0032;
G01L 21/10; G01L 7/024; G01L 19/149;
G01L 1/246; G01L 7/086; G01L 1/005;
G01L 5/228; G01L 7/06; G01L 1/2206;
G01L 7/102; G01L 13/021; G01L 27/02;
G01L 1/2262; G01L 1/24; G01L 1/26;
G01L 23/00; G01L 9/0094; G01L 19/144;
G01L 9/0082; G01L 1/125; G01L 9/0097;
G01L 1/2268; G01L 11/06; G01L 21/30;
G01L 21/34; G01L 23/221; G01L 7/187;
G01L 7/20; G01L 1/146; G01L 23/26;
G01L 7/068; G01L 1/144; G01L 1/225;
G01L 23/32; G01L 7/14; G01L 1/165;
G01L 23/12; G01L 1/241; G01L 13/04;
G01L 7/045; G01L 1/086; G01L 1/22;
G01L 7/108; G01L 9/18; G01L 1/127;
G01L 17/005; G01L 5/18; G01L 1/245;
G01L 21/32; G01L 1/183; G01L 1/2218;
G01L 9/0023; G01L 1/243; G01L 23/145;
G01L 5/0047; G01L 5/0076; G01L
9/0088; G01L 1/106; G01L 1/10; G01L
9/001; G01L 1/186; G01L 23/223; G01L
25/00; G01L 5/165; G01L 5/226; G01L
9/0017; G01L 1/044; G01L 3/245; G01L
9/005; G01L 1/08; G01L 21/16; G01L
3/1485; G01L 5/0038; G01L 5/162; G01L
5/225; G01L 7/026; G01L 7/065; G01L
9/0014; G01L 1/04; G01L 1/242; G01L
21/24; G01L 3/10; G01L 5/0004; G01L
5/0052; G01L 5/24; G01L 7/10; G01L
1/00; G01L 1/103; G01L 1/2275; G01L
1/247; G01L 21/02; G01L 21/26; G01L
23/2255; G01L 3/102; G01L 3/105; G01L
5/223; G01L 7/028; G01L 9/0011; G01L
5/00; G01L 5/0028; G01L 5/243; G01L
1/083; G01L 1/12; G01L 21/36; G01L
23/04; G01L 23/14; G01L 23/30; G01L
3/103; G01L 5/0033; G01L 5/102; G01L
5/133; G01L 5/1627; G01L 5/166; G01L
7/185; G01L 1/255; G01L 21/08; G01L
5/0057; G01L 5/22; G01L 1/042; G01L
1/122; G01L 1/2225; G01L 1/2243; G01L
1/2256; G01L 1/248; G01L 2009/0067;
G01L 2009/0069; G01L 21/06; G01L
23/06; G01L 3/00; G01L 3/06; G01L
3/1478; G01L 3/1492; G01L 3/18; G01L
38/24; G01L 3/242; G01L 5/0061; G01L
5/08; G01L 5/10; G01L 5/101; G01L
5/108; G01L 5/16; G01L 5/161; G01L
5/167; G01L 5/28; G01L 1/046; G01L
2009/0066; G01L 2019/0053; G01L
23/085; G01L 23/20; G01L 5/0071; G01L
5/008; G01L 5/06; G01L 5/171; G01L
7/106
USPC ..................................................... 73/700–756
See application file for complete search history.

(56) References Cited

U.S. PATENT DOCUMENTS

| | | | | |
|---|---|---|---|---|
| 10,539,435 | B2 * | 1/2020 | Lu | E21B 47/09 |
| 10,816,426 | B2 * | 10/2020 | Stovall | A01B 63/22 |
| 11,340,206 | B2 * | 5/2022 | Carlson | G01N 27/4165 |
| 2012/0241009 | A1 * | 9/2012 | Reid | E21B 33/037 |
| | | | | 138/31 |

(56)                    References Cited

U.S. PATENT DOCUMENTS

| | | | |
|---|---|---|---|
| 2016/0091379 | A1 | 3/2016 | Broden et al. |
| 2017/0082514 | A1* | 3/2017 | Duplain .............. G01L 19/0046 |

FOREIGN PATENT DOCUMENTS

| | | |
|---|---|---|
| WO | 18092130 | 5/2018 |
| WO | 18235087 | 12/2018 |
| WO | 19171376 | 9/2019 |
| WO | 2019/238627 A1 | 12/2019 |
| WO | 20089915 | 5/2020 |
| WO | 20129069 | 6/2020 |

* cited by examiner

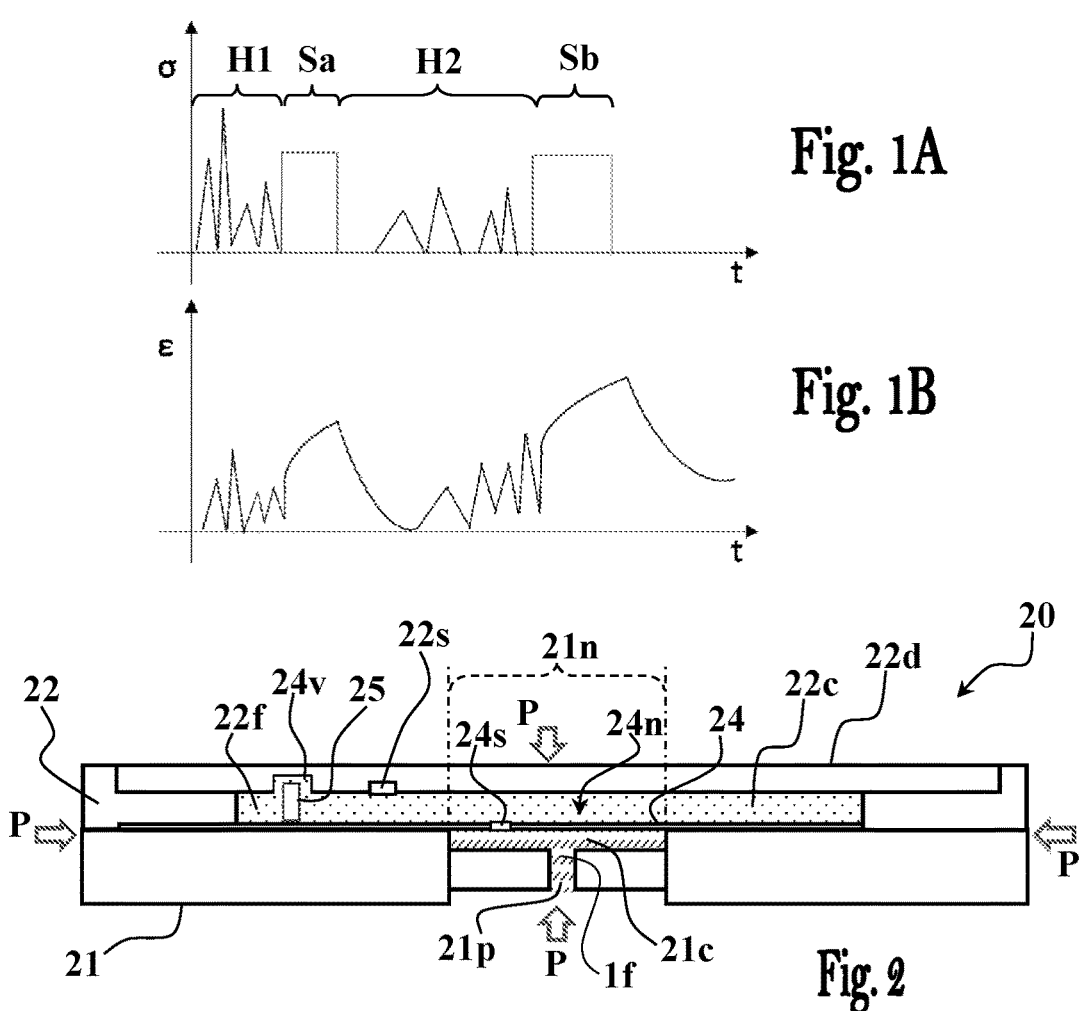
Fig. 1A
Fig. 1B
Fig. 2
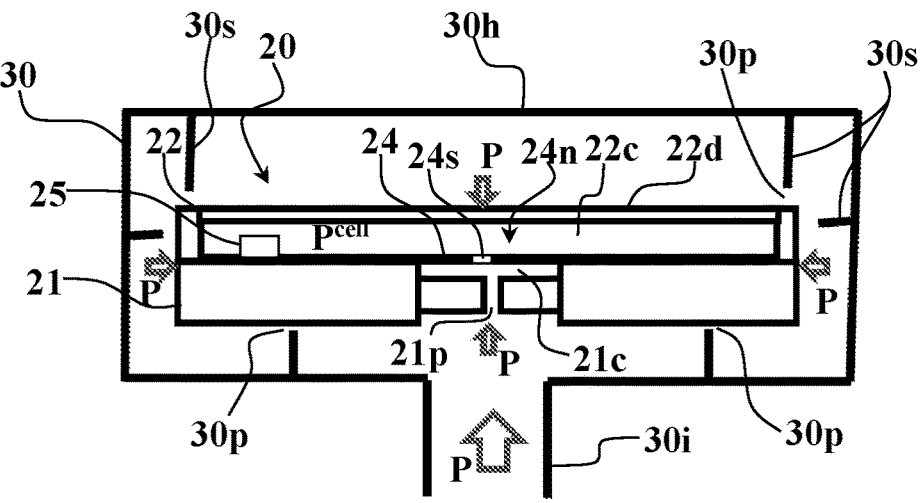
Fig. 3

CREEP/DEFORMATION COMPENSATION FOR SENSORS

TECHNOLOGICAL FIELD

The present invention is generally in the field of sensor devices.

BACKGROUND

Creep/deformation phenomena is the tendency of a solid material to deform permanently under the influence of persistent mechanical stresses. Creep/deformation can occur in, for example, viscoelastic or visco-elastoplastic materials, such as, polymers, metals operating in high temperature conditions or particulate/fiber-reinforced composite materials. In polymeric materials, it can occur as a result of stress forces that are still below the yield strength of the material. Creep/deformation occurrence is more severe in materials that are subjected to heat for long time periods, and generally its effect increases as the temperature of the material is increased to a point near its glass transition temperature, and increases even more when close to the melting temperature. When a polymeric material is subjected to a specific stress and shows viscoelasticity properties, the strain response of the material is delayed.

Viscoelastic materials are materials that exhibit both viscous and elastic properties when being deformed. For viscous materials, like Newtonian fluid, stress occurring as a reaction to shear motion is proportional to shear flow or strain rate. Elastic materials are deformed upon the loading, and immediately return to their original state once the loading ceases. Viscoelastic materials present both viscous and elastic behaviour, and exhibit time-dependent strain. Thus, a viscoelastic material can have "memory", so that stress forces subsequently applied to the material at different times, can result in strain response that is dependent on the previous stress responses of the material.

General Description

Measurement devices made from/comprising viscoelastic materials, and continuously operating under variable applied stresses, are typically not expected to maintain their performance/qualities over long operational time periods, and/or under substantially high stress levels. Such devices are likely to exhibit creep/deformation phenomena, which is particularly undesired in sensor devices implemented in viscoelastic materials. Creep/deformation phenomena occurring in such viscoelastic based devices can yield unpredictable strain responses, due to past stress events memorized by the viscoelastic materials.

The present application provides creep/deformation compensation mechanism, and techniques and devise exploiting them to implement durable and reliable sensor devices in viscoelastic materials. The creep/deformation compensation mechanism disclosed herein utilizes a sealed fluid cell/cavity made from any suitable deformable material, to implement a shock absorbing component configured to distribute the stresses applied over the device over a measurement portion having a sensing layer/portion (also referred to herein as deformable portion) and a creep/deformation compensation portion (also referred to herein as deformable wall section) of the sealed fluid cell/cavity, configured to attenuate the applied pressures and compensate creep/deformation phenomena occurring in the measurement portion.

Production techniques are also disclosed, for the construction of sensor devices that can be fabricated from any suitable material e.g., having elastic or viscoelastic properties, and that are capable of measuring fluid pressure using a pressure reducing/attenuating mechanism of the present disclosure. The pressure reducing/attenuating mechanism of the sensor devices disclosed herein is configured to impart reduced pressures over the sensing components of the sensor e.g., sensing foil, base structure, cover, etc. and/or over parts connected or welded therein (i.e., due to the difference between the internal pressure of the fluid cavity/cell and the externally applied pressure).

One inventive aspect of the subject matter disclosed herein relates to a sensor device comprising at least one sensor element, and a sealed fluid cell having a predefined internal pressure, and a compensating portion and a measurement portion. The compensating portion and/or the measurement portion are coupled in some embodiments to the at least one sensor element. The compensating and measurement portions are configured to deform in response to externally applied (e.g., fluid) pressure, to thereby change internal pressure conditions inside the sealed fluid cell and cause the measurement portion to experience a differential pressure that substantially equals to a difference between the externally applied pressure and the predefined internal pressure of the fluid cell. Optionally, the compensating and measurement portions of the fluid cell are made from the same material, or from materials having same/similar creep/deformation behavior/properties, to thereby compensate creep/deformation phenomena occurring in the measurement portion.

Production techniques are also disclosed for embodiments having self-compensated measurement portions, wherein the measurement portion is also configured for creep compensation.

The sensor device can comprise a hollow enclosure accommodating the sealed fluid cell thereinside. The hollow enclosure can have at least one fluid inlet for introducing the external fluid pressure.

The measurement portion can be implemented by a sensing layer having the at least one sensor element in a deformable portion thereof, and at least one circuitry configured to receive measurement data/signals from the at least one sensor element and transmit data/signals indicative thereof to at least one external device or system. The sensor device comprises in some embodiments a base portion configured to define a measurement chamber, wherein the sensing layer is configured to sealably close an opening of the measurement chamber, and a cover portion having a cavity sealably closed by the sensing layer, thereby forming the sealed fluid cell. Accordingly, the sensing layer can be configured to sealably close an opening connecting the measurement chamber to the sealed fluid cell, so as to sealably partition between the interior of the measurement chamber and the interior of the sealed fluid cell.

Another inventive aspect disclosed herein relates to a sensor device comprising a sealed fluid cell having an internal cavity filled with fluid media, a compensation portion, and a measurement portion configured to interact with the fluid media of the sealed fluid cell, and at least one sensor element coupled to said at least measurement portion of the sealed fluid cell. The compensation and measurement portions are configured to deform in response to externally applied fluid pressure to thereby change internal pressure conditions inside the sealed fluid cell and cause the measurement portion to experience differential pressure conditions corresponding to the external fluid pressure and to an internal fluid pressure inside the sealed fluid cell. In some embodiments the compensation and measurement portions are made from the same material, or from materials having same/similar creep/deformation behavior, to thereby compensate creep/deformation phenomena occurring in the measurement portion.

The sensor device comprises in some embodiments one or more deformations regulating elements disposed inside the internal cavity of the sealed fluid cell and coupled to the compensation portion and configured to achieve a desired relation between the externally applied pressure and the internal pressure inside said sealed fluid cell. Optionally, the sensor device comprises one or more support elements inside the internal cavity of the sealed fluid cavity configured to support the one or more deformations regulating elements disposed thereinside.

In some possible embodiments the sensor device comprises a hollow enclosure accommodating the sealed fluid cell thereinside. The hollow enclosure can have at least one fluid inlet for applying the external fluid pressure to the sealed fluid cell. Optionally, the sensor device comprises one or more support members configured to couple the sealed fluid cell to an internal wall of the hollow enclosure while enabling the sealed fluid cell to interact with fluid media causing the external fluid pressure. The one or more support members may comprise one or more fluid passages configured for passage of the fluid media causing the external fluid pressure therethrough inside the hollow enclosure to thereby surround the sealed fluid cell with the fluid media.

The measurement portion can comprise a sensing layer having the at least one sensor element in a deformable portion of the sensing layer. In possible embodiments the sensing layer comprises at least one circuitry configured to receive measurement data/signals from the at least one sensor element and transmit data/signals indicative thereof to at least one external device or system. The sensor device comprises in some embodiments a base portion configured to define a measurement chamber. The sensing layer can be configured to sealably partition between the measurement chamber provided in the base portion and the internal cavity of the sealed fluid cell. Optionally, the sensor device comprises one or more deformations regulating elements disposed inside the measurement chamber and coupled to the sensing layer of the measurement portion, and configured to achieve a desired relation between the externally applied pressure and the internal pressure inside the sealed fluid cell.

In possible embodiments the measurement chamber is at least partially filled with an intermediating component configured to convey the external fluid pressure into the measurement chamber without direct contact between the sensing layer and a fluid substance affecting/causing the external fluid pressure. The sensor device can optionally comprise a cover portion configured to define a cavity of the sealed fluid cell. An opening of this cavity can be sealably closed by the sensing layer, thereby sealably closing the internal cavity of the sealed fluid cell. The sensor device comprises in some embodiments at least one sensor element operably installed inside the internal cavity of the sealed fluid cell and configured to measure at least one property or condition of the fluid media filling the internal cavity. Optionally, the at least one sensor element operably installed inside the internal cavity of the sealed fluid cell is configured to measure at least one property or condition of the fluid media affecting the external fluid pressure.

The sensor device comprises in some embodiments at least one circuitry configured to activate the at least one sensor element and receive measurement data/signals from the at least one sensor element and transmit data/signals indicative thereof to at least one external device or system. The sensor device can further comprise a communication module configured for at least one of the following: (i) power the at least one circuitry of the sensor device; (ii) receive the data/signals transmitted from the at least one circuitry; and/or (iii) communicate the data/signals received from the at least one sensor element to a remote device or system. The communication module can be configured to wirelessly power the at least one circuitry of the sensor device, and/or to wirelessly receive the data/signals transmitted from the at least one circuitry.

The sealed fluid cell is defined in some embodiments inside a spherical or cylindrical shaped element having a circumferential channel defining the internal cavity of the sealed fluid cell. At least one portion (e.g., deformable) of the spherical or cylindrical shaped element can be configured to define the compensation portion of the senor device. The measurement portion can comprise a circumferential deformable portion sealably covering the circumferential channel. The sensor device comprises in some embodiments one or more fluid channels passing through the spherical or cylindrical shaped element to fluidly communicate with the circumferential cavity.

Yet another inventive aspect disclosed herein relates to a method of preparing a sensor device. The method comprising preparing a base portion and forming therein a deformable portion with at least one sensor element, preparing a cover portion to include a cavity and at least one compensation portion deformable towards said cavity, filling said cavity with fluid media and attaching said cover portion to said base portion such that an opening of said cavity is sealably closed by said deformable portion. In some embodiments the cover portion is attached to the base portion without the compensation portion, the cavity is filled with the fluid media and then sealed by the compensation portion by attaching sealably attaching it to the cover portion.

The method comprises in some embodiments coupling at least one circuitry to the at least one sensor element. The method optionally comprises externally powering the at least one circuitry by an external module, and transmitting by the at least one circuitry signals/data produced by the at least one sensor element to the external module.

The method can further comprise coupling inside the cavity of the cover portion one or more deformations regulating elements to the compensation portion to achieve a desired relation between the externally applied pressure an internal pressure inside the cavity.

Optionally, but in some embodiments preferably, the preparing of the base portion comprises preparing a measurement chamber in the base portion configured to convey external fluid pressure to the deformable portion. The method can further comprise coupling inside the measurement chamber one or more deformations regulating elements to the sensing layer of the base portion to achieve a desired relation between the externally applied pressure and an internal pressure inside the cavity of the base portion. Optionally, the method comprising at least partially filling the measurement chamber with an intermediating component configured to convey the external fluid pressure into the measurement chamber without establishing direct contact between the sensing layer and a fluid substance affecting said external fluid pressure.

In some possible embodiments the method comprises placing the cover portion with the base portion attached to it inside a hollow housing having an opening configured to convey the external fluid pressure into the hollow housing to substantially surround said cover and base portions.

The preparing of the cover portion can comprise forming a circumferential channel in a spherical or cylindrical shaped element, and the preparing of the base portion can comprise attaching or forming at least one sensor element to a circumferential deformable portion and sealably covering the circumferential channel with the circumferential deformable portion. The method can further comprise forming one or more fluid channels in the spherical or cylindrical shaped element. The one or more fluid channels configured to fluidly communicate with the circumferential cavity.

Yet another inventive aspect of the disclosed subject matter relates to a sensor device comprising a spherical or cylindrical shaped element having a circumferential channel defining an internal cavity and at least one deformable portion configured to define a compensation portion of the sensor device, and a circumferential deformable portion sealably attached over said circumferential channel to define a sealed fluid cell of a measurement portion of said sensor device. The sensor device comprises in some embodiments one or more fluid channels passing through the spherical or cylindrical shaped element to fluidly communicate with the circumferential cavity.

BRIEF DESCRIPTION OF THE DRAWINGS

In order to understand the invention and to see how it may be carried out in practice, embodiments will now be described, by way of non-limiting example only, with reference to the accompanying drawings. Features shown in the drawings are meant to be illustrative of only some embodiments of the invention, unless otherwise implicitly indicated. In the drawings like reference numerals are used to indicate corresponding parts, and in which:

FIGS. 1A and 1B graphically illustrate a memory response of a viscoelastic material, wherein FIG. 1A shows the stress acting on the material, and FIG. 1B shows the responsive strain in the viscoelastic material;

FIG. 2 schematically illustrates a sensor unit according to some possible embodiments;

FIG. 3 schematically illustrates a sensor device according to some possible embodiments;

FIGS. 9A and 9B schematically illustrate a sensor application implementing the self-compensation measurement components and principles disclosed herein, wherein FIG. 9A shows a side view of the sensor and FIG. 9B shows a sectional view thereof.

DETAILED DESCRIPTION OF EMBODIMENTS

Figure 4:
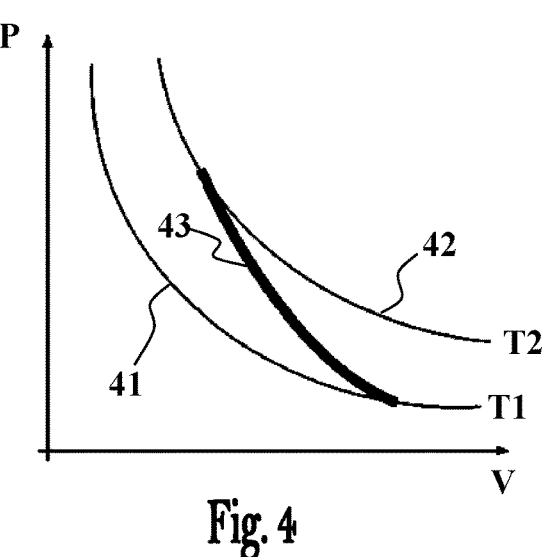
FIG. 4 illustrates pressure curves vs volume curves of adiabatic and isothermal processes, and the transition between these processes as obtained in some embodiments.

One or more embodiments of the present disclosure will be described below with reference to the figures, which are to be considered in all aspects as illustrative and not restrictive. In attempt to provide a concise description of these embodiments, not all features or details of implementations are disclosed at length in the specification. Elements illustrated in the drawings are not necessarily to scale, or in correct proportional relationships, which are not critical. Emphasis instead being placed upon clearly illustrating the principles of the invention such that persons skilled in the art will be able to make and use the creep/deformation mechanism, once they understand the principles of the subject matter disclosed herein. This invention may be provided in other specific forms and embodiments without departing from the essential characteristics described herein.

Viscoelastic materials are generally not considered a good choice for implementing pressure or weight sensors (or in general any strain-based sensor). The values measured by the sensor devices implemented in viscoelastic materials are typically not so reliable (especially absolute values), because they are delayed in time due to very slow response times, and the values thereby measured are dependent from/ influenced by the previously applied and measured stress i.e., stresses history.

Strain sensors are typically based on elastic materials (e.g., ceramic, metal, silicon). Strain gauge sensors implemented on polyimide substrates (viscoelastic materials) are usually glued on metal support and measure the strain of the metal support (which is an elastic material). One object of the present application is to compensate the creep/deformation, and other viscoelasticity effects, of viscoelastic substrates, so that they can be used as direct substrates for strain-based sensors.

The present application provides a creep/deformation compensation mechanism, and sensor devices implemented in viscoelastic materials utilizing it to compensate creep/ deformation phenomena. The creep/deformation compensation mechanism disclosed herein utilizes a sealed fluid cell/cavity made from any suitable deformable material. The sensor device and its sealed fluid cell/cavity can be manufactured from the same materials, or from materials having same/similar viscoelastic behavior/properties. This way pressures applied over the device can be distributed over a measurement portion having a sensing layer/portion of the device, and optionally also over a creep/deformation compensation portion (deformable wall section) of the sealed fluid cell/cavity. The sealed fluid cell/cavity is configured to attenuate the pressures applied over the sensing layer/portion of the device and compensate creep/deformation phenomena occurring therein.

A sensor unit employing this creep/deformation mechanism comprises in some possible embodiments a measurement chamber having an opening sealed by a sensing layer/portion of the measurement portion/element at one side of the sealed fluid cell/cavity, and the creep/deformation compensation portion/element in another (e.g., opposite, or any other) side of the sealed fluid cell/cavity. The sensor unit is mounted in some embodiments centered inside a hollow enclosure (also referred to herein as housing) having a fluid inlet, such that fluid pressure introduced via the fluid inlet is evenly distributed over the sealed fluid cell. The sealed fluid cell is configured to attenuate the pressures applied over the sensing layer/portion and compensate creep/deformation phenomena occurring therein.

For an overview of several example features, process stages, and principles of the invention, the examples of the sensor devices illustrated schematically and diagrammatically in the figures are intended for a pressure sensing application. These pressure sensing implementations are shown as one example implementation that demonstrates a number of features, processes, and principles used to provide pressure attenuation and/or creep/deformation compensation, but they are also useful for other applications and can be made in different variations. Therefore, this description will proceed with reference to the shown examples, but with the understanding that the invention recited in the claims below can also be implemented in myriad other ways, once the principles are understood from the descriptions, explanations, and drawings herein. All such variations, as well as any other modifications apparent to one of ordinary skill in the art and useful in fluidic sensor applications may be suitably employed and are intended to fall within the scope of this disclosure.

FIGS. 1A and 1B illustrate memory response of viscoelastic material, demonstrating how the application of same stress levels Sa,Sb to a viscoelastic material can result in different strain responses due to previous stress history. FIG. 1A shows the stress acting ($\sigma$) on the material, and FIG. 1B shows the responsive strain ($\varepsilon$) in the viscoelastic material. As seen in FIG. 1B, the stress history H1 and H2 is memorized by the material, which is causing bias/delays and gradual decays in the strain exhibited by the material in response to the applied strains Sa,Sb.

FIG. 2 shows a sensor unit 20 (also referred to herein as fluid cell) configured to substantially compensate and attenuate creep/deformation phenomena. The sensor unit 20 in this non-limiting example comprises a base portion 21 carrying a sensing layer 24, and a cover portion 22 having at least one deformable wall section 22d. The base portion 21 is configured to define a measurement chamber 21c, and a fluid passage 21p configured to communicate fluid media with the measurement chamber 21c. The sensing layer 24 comprises at least one deformable (e.g., viscoelatic or flexible) portion/element 24n carrying one or more sensing elements 24s therein (and/or thereon). The sensing layer 24 is configured to attach to the top side of the base portion 21, and sealably cover the opening 21n of the measurement chamber 21c by its deformable portion/element 24n. The cover portion 22 is configured to attach to the top side of the base portion 21 and define a sealed fluid cavity/cell 22c filled with fluid media 22f (e.g., gas, air, or any other suitable compressible media) interacting with the sensing layer 24.

Optionally, but in some embodiments preferably, the cover portion 22 is used to sealably attach the sensing layer 24 to the base portion 21 such that its deformable portion/element 24n is located over the opening 21n of the measurement chamber 21c. In this, and other, embodiments the sensing layer 24 is configured to partition between the fluid cavity/cell 22c and the measurement chamber 21c. In some embodiments the width of the fluid passage 21p substantially equals to the width of the opening 21n of the measurement chamber 21c.

With this configuration, fluid media If flowing into (or out of) the measurement chamber 21c and interacting with the deformable portion/element 24n of the sensing layer 24 covering the opening 21n of the measurement chamber 21c and of the measurement chamber 21c, responsively causes deformations of its deformable portion/element 24n towards (or away from) the sealed fluid cavity/cell 22c. The fluid media 22f enclosed inside the sealed fluid cavity/cell 22c is configured to present a certain level of resistance to the deformations of the deformable portion 24n, and thereby attenuate the pressure P applied by the fluid media If thereover. The attenuated pressure over the deformable portion 24n is sensed by the one or more sensing elements 24s, which generates measurement signals/data indicative thereof.

The sensing layer 24 comprises in some embodiments electrical conductors and/or circuitry 25 electrically connected to the one or more sensing elements 24s, and configured to receive the measurement signals/data therefrom, process, store, and/or transmit the measurement data. The circuitry 25 can be configured to transmit the measurement data to an external device/system (not shown) wirelessly (e.g., using IR, RF—Bluetooth, WiFi, Zigbee, NFC, signaling, or suchlike) and/or over data communication wires/bus (e.g., USB, UART, or suchlike).

Optionally, but in some embodiments preferably, one or more sensor elements 22s are provided in the deformable wall section 22d, for measuring one or more properties/conditions of the fluid media sealed inside the fluid cavity/cell 22c. Alternatively, or additionally, the one or more sensor elements 22s provided in the deformable wall section 22d can be configured for measurement of one or more properties/conditions of the fluid media If affecting the external fluid pressure P. The one or more sensor elements 22s can be similarly coupled to the circuitry 25 for conveying measurement data/signals thereby generated to external devices/systems.

The sensing layer 24 can be implemented by any of the sensor on foil/film embodiments disclosed and illustrated in International Patent Publication Nos. WO 2018/025264, WO 2018/092130, WO 2018/235087, WO 2019/171376, WO 2020/089915, WO 2020/129069, of the same Applicant hereof, the disclosures of which is incorporated herein by reference. The attachment/integration of the sensing layer 24 to the base portion 21 can be carried out using any of the techniques disclosed and illustrated in these International Patent Publications. The cover portion 22 can be attached to the base portion 21 by laser welding, ultrasonic welding, heat welding, gluing, overmolding or suchlike.

The deformable wall section 22d of the cover portion 22 is configured to provide creep/deformation (viscoelasticity) compensation to the sensor unit 20. In order for it to provide creep/deformation compensation properties, the deformable wall section 22d is made in some embodiments from the same material used to make the sensing layer 24, or from a different material having same/similar creep/deformation behavior/properties. The deformable wall section 22d can be attached to the cover portion 22 by laser welding or ultrasonic welding, or gluing, or suchlike. Other parts of the cover portion 22, and also of the base portion 21, can be manufactured by injection molding, CNC, 3D printing or suchlike.

Optionally, but in some embodiment preferably, the deformable wall section 22d is made from the same material of the cover portion 22, and it can be manufactured as an integral part of the cover portion 22.

The geometrical dimensions/structure of the fluid passage 21p can be configured to protect the measuring components associated with the measurement chamber 21c, to thereby prevent abrupt pressure changes thereinside. In some embodiments the fluid passage 21p is configured to trap air inside the measurement chamber 21c, to thereby protect the deformable portion/element 24n e.g., from hard water, by creating a small air pillow thereinside. In possible embodiments the sectional area of the fluid passage 21p is about 0.01 mm² to 1000 mm².

In some embodiments the cavity of the measurement chamber 21c, and optionally at least some portion of the fluid passage 21p, can be filled with air acting as an intermediating component (shown at 1f) conveying the fluid pressure P at the opening of the fluid passage 21p into the measurement chamber 21c i.e., the deformable portion/element 24n interacts with the intermediating component instead of interacting directly with the fluid media causing the fluid pressure P. In some possible embodiments the cavity of the measurement chamber 21c, and optionally at least some portion of the fluid passage 21p, are filled with a flexible substance (shown at 1f e.g., silicone), or any suitable type of a soft material (e.g., gel), capable of conveying the pressure P at the entrance/opening of the fluid passage 21p to the deformable portion/element 24n. In such embodiments the flexible substance (1f) can be configured to convey the pressure P to the deformable portion/element 24n, and also to protect the deformable portion/element 24n from high pressure conditions If needed, the deformable wall section 22d can be configured to include one or more cavities 24v for accommodating the electric components/circuitry 25 provided in, or on, the sensing layer 24. Optionally, but in some embodiment preferably, the cavity 24v is exploited to accommodate additional sensing elements e.g., temperature, pH, conductivity, optical measurement (not shown), configured to sense fluid properties/conditions inside the fluid cavity/cell 22c, and/or of the outside environment. In possible embodiments the sensor unit 20 is configured as a completely passive unit, that is powered, and communicate data, by means of an external device (e.g., by NFC), for example, as demonstrated in FIG. 8. Alternatively, or additionally, electrical conductors/wires (not shown) connected to the sensor unit 20 can be used for powering and communicating with it, without compromising the sealing of the fluid cavity/cell 22c.

FIG. 3 shows a sensor device 30 having a fluid inlet 30i configured to communicate fluid pressure P with a hollow housing 30h equipped with the sensor unit 20. The sensor unit 20 can be installed inside the hollow housing 30h by a plurality of support members 30s extending inwardly from its internal walls and configured to position the sensor unit 20 substantially centered inside the hollow housing 30h. The support members 30s are configured to define fluid passages 30p for providing substantially free flow of the fluid substance introduced into the hollow housing 30h via the fluid inlet 30i, around and surrounding the sensor unit 20, and thereby cause application of the fluid pressure P over the components of the sensor unit 20 substantially from all directions.

This way, the fluid pressure P applied via the inlet 30i propagates into the hollow housing 30h and into the measurement chamber 21c of the sensor unit 20 centered thereinside, and into the volume surrounding the sensor unit 20. Thus, the same fluid pressure P over the deformable portion/element 24n of the sensing layer 24 is also applied over the deformable wall section 22d of the cover portion 22. Accordingly, when fluid pressure P is applied, the sensing layer 24, and the deformable wall section 22d, are both deflected inwardly i.e., into the fluid cavity/cell 22c, and responsively the volume enclosed by the fluid cavity/cell 22c is reduced. The process inside the fluid cavity/cell 22c can be isothermal or adiabatic. In both cases the pressure inside the fluid cavity/cell 22c is increased in response to increased pressure P operating over the sensor unit 20, because the volume of the fluid cavity/cell 22c is reduced.

FIG. 4 graphically illustrates pressure vs volume curves of isothermal process (41) at temperature T1 and isothermal process (42) at temperature T2, and the adiabatic process (43) (transition between two isothermal curves) obtained in some embodiments. For example, an abrupt pressure change of the pressure P applied to the sensor device 30 when the sensor device 30 is on the isothermal curve (41) at temperature T1 can cause an adiabatic process (43) and sensor device 30 will jump on isothermal curve (42) at temperature T2, for which the relationship between the applied pressure P and the volume V of the fluid cavity/cell 22c is $P \cdot V^\gamma = K$, where K is a constant and the exponent $\gamma > 1$. This means that the internal pressure inside the measurement chamber 22c increases faster than in simple isothermal process, and thus can be used to protect the system from burst pressure changes at the fluid inlet 30i.

The creep/deformation compensation obtained by the sensor device 30 is demonstrated in the following example for isothermal processes (41) or (42), for which $P \cdot V = K$ (costant). Assuming the initial volume V1 of the fluid cavity/cell 22c is filled with air and sealed at atmospheric (absolute) pressure $P^{cell}_1 = 1$ Bar, if fluid pressure of 2.5 Bar (2.5 Bar relative to the atmospheric pressure i.e., the absolute pressure applied is P=3.5 Bar) is applied via the inlet 30i, a reduction to about ⅓ in the volume of the fluid cavity/cell 22c responsive to the inward deformations of the deformable portion/element 24n and the deformable wall section 22d will cause the pressure inside the fluid cavity/cell 22c to change into the absolute pressure value of $p^{cell}_2 = 3$ Bar i.e., $\Delta P^{cell} = (P^{cell}_1 - P^{cell}_2) = 3-1 = 2$ Bar. In this case the pressure P' over the deformable portion 24n equals to the difference between the applied absolute pressure P=3.5 Bar and the new absolute pressure of $P^{cell}_2 = 3$ Bar inside the fluid cavity/cell 22c i.e., the pressure measured by the sensing element 24s is $P' = P - P^{cell}_2 = 3.5 - 3.0 = 0.5$ bar).

Similarly, in another example, if fluid pressure of 5 Bar (5.0 Bar relative to the atmospheric pressure i.e., the absolute pressure applied is P=6.0 Bar) is applied via the inlet 30i, a responsive reduction to about ⅕ in the volume of the fluid cavity/cell 22c will cause the pressure inside the fluid cavity/cell 22c to change into the absolute pressure value of $P^{cell}_2 = 5$ Bar i.e., $\Delta P^{cell} = (P^{cell}_2 - P^{cell}_1) = 5-1 = 4$ Bar, and the pressure P' over the deformable portion 24n equals to the difference between the absolute applied pressure P-6 Bar and the new absolute pressure of $p^{cell}_2 = 5$ Bar inside the fluid cavity/cell 22c i.e., the pressure measured by the sensing element 24s is $P - P^{cell}_2 = 6-5 = 1$ Bar).

As these examples demonstrate, the pressure sensed by the deformable portion/element 24n is the differential pressure that is responsive to the changes in the volume V of the fluid cavity/cell 22c caused by the deformation of the deformable wall section 22d and the deformation of the deformable portion/element 24n itself. Thus, this mechanism attenuates the pressure P' over the deformable portion 24n of the sensing layer 24, which is also sensed by the sensing element 24s, and correspondingly compensate the creep/deformation phenomena of the viscoelastic materials from which the sensing layer 24 is made. In addition, in this non-limiting example, if the deformable elements of the sensor unit 20 (e.g., the deformable wall section 22d and the deformable portion 24n) are creeping, they deform inwardly into the cavity 22c, and thereby increase the internal pressure inside the cavity 22c, and this increase of the internal pressure oppose the creep deformation and stops it.

This configuration, wherein two deformable elements are on the fluid cavity/cell 22c, can be advantageously used for:

(i) creep compensation; and/or (ii) high pressure measurements (pressure divider)—for example, the sensor can be designed to work with an external pressure of 100 Bar while the differential pressure sensed by the sensing element 24s is actually attenuated to about 20 Bar i.e., the materials of the sensor device experience substantially lower stress/loads (e.g., pressures can be reduced by a factor of 1.5 to 1000, optionally about 10), such that simpler and more cost effective materials can be used.

In case of an adiabatic process (e.g., a step pressure burst P is applied) the internal pressure of the fluid cavity/cell 22c will rise faster and will thereby protect the deformable element 24n (e.g., they will not be damaged by going into plastic deformation region, or become detached from their supports elements). This configuration of the sensor device 30 thus results is a strain sensor that can withstand higher pressure bursts, or over pressure events.

The relation between the externally applied pressure P and the internal pressure $P^{cell}$ inside the fluid cavity/cell 22c can be kept to provide a desired behavior (e.g., substantially linear), by adjusting the geometrical shape of the compensation deformable wall section 22d, and/or by adding support elements to control its deformation.

Figure 5:
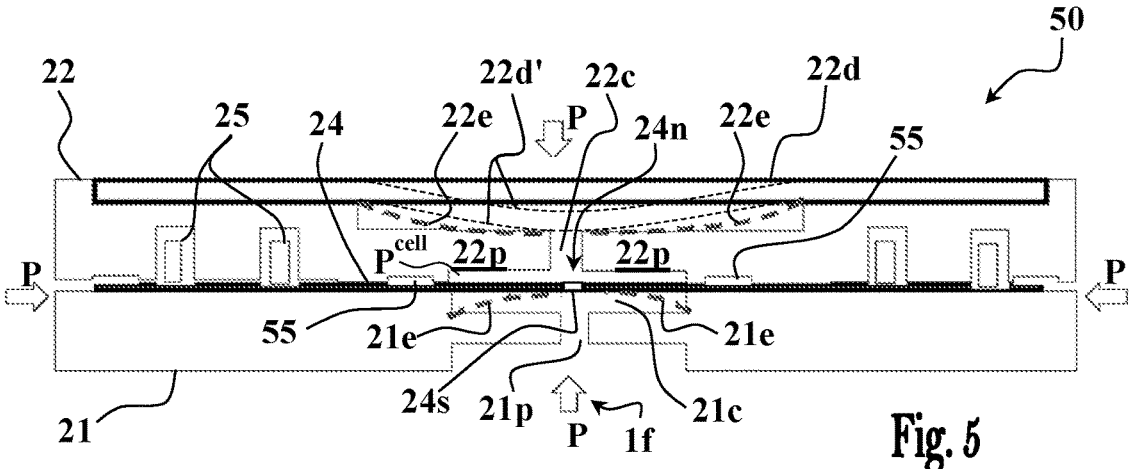
FIG. 5 schematically illustrates use of deformation regulating elements in the sensor device according to some possible embodiment to obtain a desired relation/dependency between the externally applied pressure and the internal pressure of the sensor unit (e.g., fluid cell)

FIG. 5 schematically illustrates use of deformations regulating elements 22e provided inside the fluid cavity/cell 22c of the sensor unit 50 and mechanically coupled to the deformable wall section 22d to cause a desired relation (e.g., linear, quadratic, quasi-linear, cubic, polynomial, logarithmic, exponential, or the like) between the externally applied pressure P and the internal pressure $P^{cell}$ inside the fluid cavity/cell 22c. The shape/profile of the support elements 22p is adjusted in some embodiments according to the type of media provided inside the fluid cavity/cell 22c of the sensor unit 50.

In this non-limiting example the fluid cavity/cell 22c comprises support elements 22p used to support and/or limit and/or stop deformations regulating elements 22e (shown as dashed lines) for compensating deformations of the deformable wall section 22d. Optionally, but in some embodiments preferably, the measurement chamber 21c is similarly equipped with deformations regulating elements 21e mechanically coupled to the deformable portion 24n of the sensing layer 24, for respective compensating deformations of the deformable portion 24n, and provide the wanted relation between the externally applied pressure P and the internal pressure $P^{cell}$ inside the fluid cavity/cell 22c.

The deformations regulating elements 21e,22e can be parts of the cover portion 22 configured to follow/regulate the deformation of the deformable portion 24n, and thereby control the changes of the volume inside the cavity 22c, and the changes of pressure thereinside, correspondingly. The deformations regulating elements 21e,22e can have any suitable shape, form or profile (e.g., arc-shaped, stepped configuration, splined, sinusoidal, linear, or any combination thereof). The dashed lines 22d' show the deformable wall section 22d as it deformed due to the applied pressure P.

The deformations regulating elements 22e,21e facilitates better control of the internal volume of the fluid cavity/cell 22c, when the respective two deformable elements 22d,24n deforms, thereby providing the desired dependency/relationship between the internal pressure $P^{cell}$ residing inside the fluid cavity/cell 22c and the externally applied fluid pressure P acting on the sensor unit 50, which reduces and/or stops creep/deformation phenomena, and support the deformable elements 22d,24n at high pressure to avoid damages or sharp stress points.

As also seen in FIG. 5, in some embodiments the cover portion 22 comprises cavities 55 configured to accommodate components (not shown) of the sensing layer, such as, but not limited to, circuitries, antennas, battery, used to read measurements from the sensing elements 24s.

Figure 6:
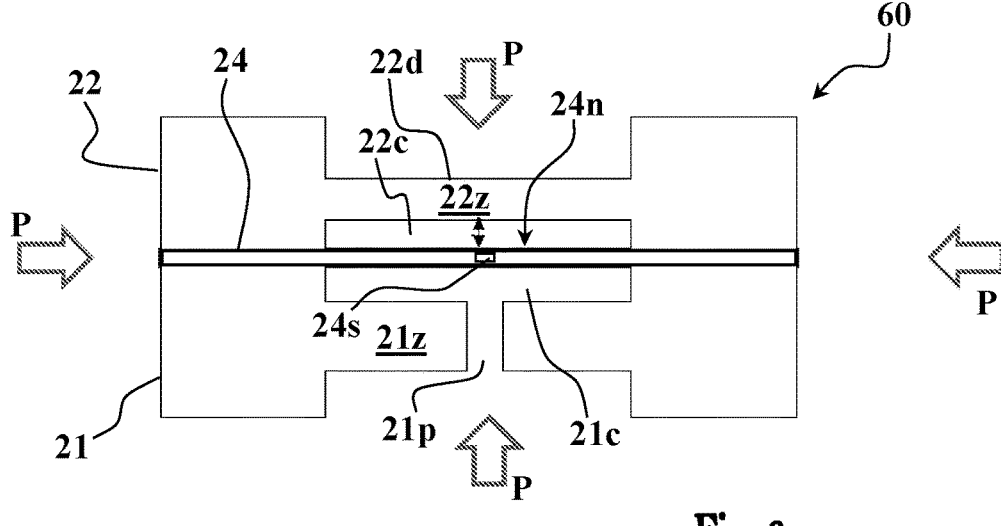
FIG. 6 schematically illustrates a sensor unit according to possible embodiments having a cover portion with a sensing layer attached to it.

FIG. 6 schematically illustrates a sensor unit 60 wherein the cover portion 22 is configured to support the sensing layer 24 and the internal cavity 22c of the sensor unit 60. In this non-limiting example, the base portion 21 and the cover portion 22, both have a generally sectional H-shaped components, wherein the horizontal arm 21z of the H-shaped base portion 21 comprises the fluid passage 21p formed therein (bypass through hole). As seen, the sensing layer 24 is sandwiched between the base portion 21 and the cover portion 22, thereby forming the sealed fluid cavity/cell 22c between the horizontal arm 22z and vertical legs of the cover portion 22 and the deformable portion 24n of the sensing layer 24, and the measurement chamber 21c between the horizontal arm 21z and vertical legs of the base portion 21 and the deformable portion 24n. In this embodiment the deformable wall section 22d is implemented by the horizontal arm 22z of the H-shaped cover portion 22 i.e., the horizontal arm 22z, deforms into (or out of) the fluid cavity/cell 22c when the external pressure P is applied. The cover potion 22 can clamp the sensing layer 24 to the base portion 21, as its vertical legs are pressed over the edges of the sensing layer 24 against the vertical legs of the base portion 21.

The shape/profile of the support elements 21z is adjusted in some embodiments according to the type of media interacting with the sensor unit 60 and applying the fluid pressure P.

Figure 7:
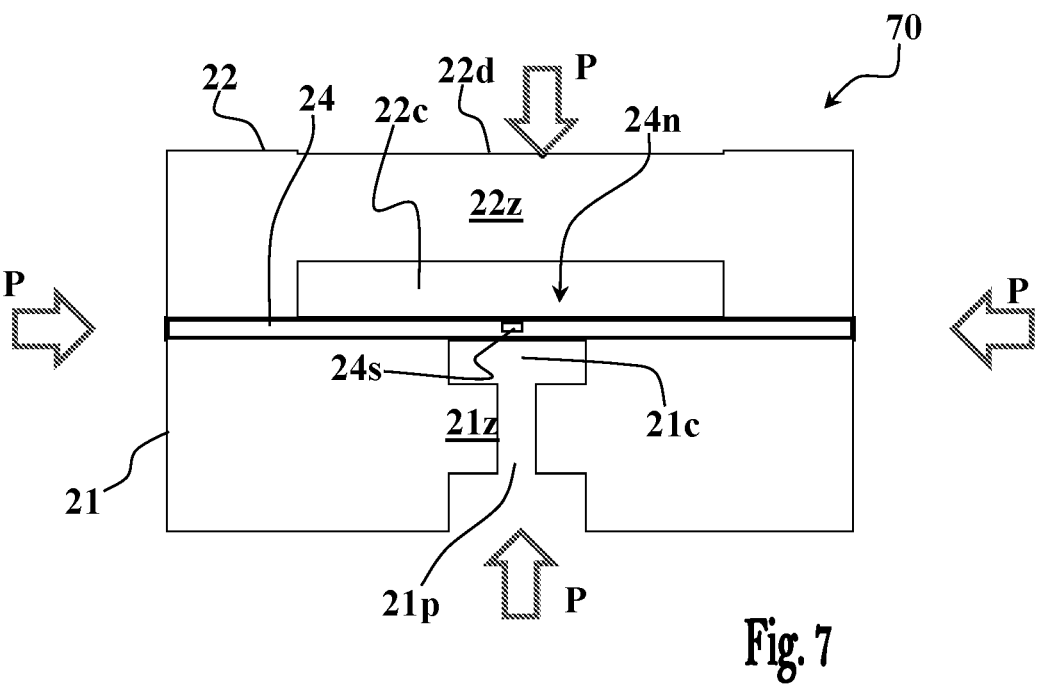
FIG. 7 schematically illustrates another sensor unit according to possible embodiments having a cover portion configured to form a fluid cavity/cell having a defined volume.

FIG. 7 schematically illustrates another sensor unit 70 configuration wherein the cover portion 22 is configured to support the sensing layer 24 and form the sealed fluid cavity/cell 22c. In this non-limiting example the base portion 21 have a generally sectional H-shape, wherein the horizontal arm 21z of the H-shaped base portion 21 comprises the fluid passage 21p formed therein e.g., by a pass-through bore, and the cover portion 22 have a sectional n-shape. As seen, the sensing layer 24 is sandwiched between the base portion 21 and the cover portion 22, thereby forming the sealed fluid cavity/cell 22c between the horizontal section 22z and vertical legs of the cover portion 22 and the deformable portion 24n of the sensing layer 24, and forming the measurement chamber 21c between the horizontal arm 22z and vertical legs of the base portion 21 and the deformable portion 24n. The deformable wall section 22d is implemented by the horizontal section 22z of the n-shaped cover portion 22. Accordingly, the cover portion 22 is configured to create a specific volume of the fluid cavity/cell 22c above the deformable portion 24n.

Accordingly, the ∩-shape cover portion 22 define the internal cavity 22c of the sensor unit 70, and it can clamp the sensing layer 24 to the base portion 21, as its vertical legs are pressed over the edges of the sensing layer 24 against the vertical legs of the base portion 21. In possible embodiments the cover portion 22 in FIG. 7 has low deformation capability, so the main compensation of the sensor unit 70 is thus obtained from the deformation of the deformable portion 24n.

As seen, in this specific and non-limiting example the fluid cavity/cell 22c is not confined to the edges of the deformable portion 24n, and the fluid cavity/cell 22c comprises portions of the sensing layer 24 that are supported/attached to the base portion 21. Optionally, thickness of the cover portion 22 can be configured do permit deformations thereof in response to applied pressures, such that compensation elements of sensor 70 are implemented in the cover potion 22. Alternatively, the thickness of the cover potion 22 can be considerably thick to preclude any compensation thereof, such that the internal volume of the fluid cavity/cell 22c, and the changes in its internal volume (and consequently the changes in its internal pressure) are mainly/only due to the deformation of the deformable portion 24n.

Figure 8:
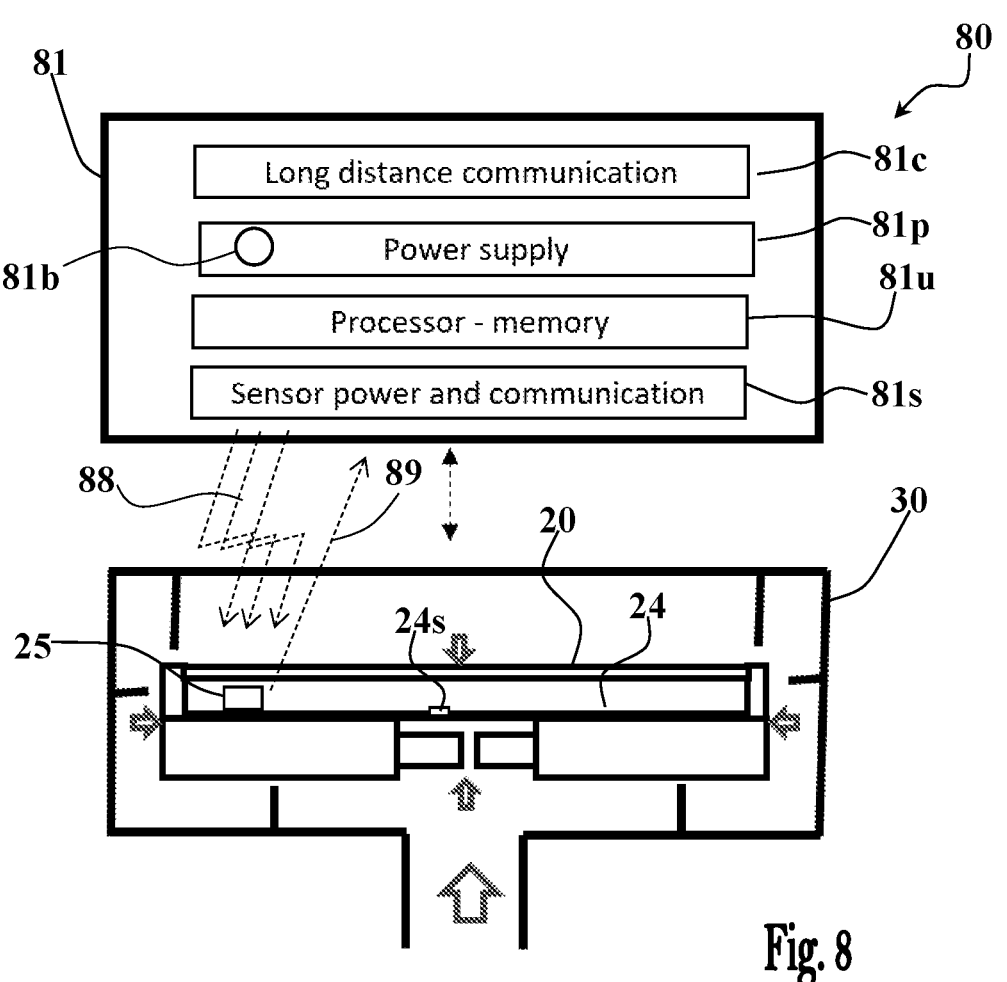
FIG. 8 schematically illustrates a modular sensor device configuration according to possible embodiments.

FIG. 8 schematically illustrates a modular sensor device 80 configuration according to possible embodiments. In this non-limiting example an external powering and data communication module 80 is used to power and communicate data (e.g., by near-filed-communication—NFC) with the sensor device 30. The powering and data communication module 81 can be powered by an internal power source (e.g., battery 81b), or by any other power source (e.g., main power supply, harvesting from solar energy, wind, vibration, etc.) 81p, and it comprises a sensor power and data communication module 81s configured to transmit electromagnetic (RF) radiation 88 for powering the circuitry 25 of the sensor unit 20. The circuitry 25 is configured to convert the RF radiation 88 from the sensor power and data communication module 81s into electrical energy, power the one or more sensing elements 24s of the sensing layer 24 and transmit the measurement signals/data form the sensing elements 24s.

The sensor power and data communication module 81s is configured to receive the measurement signals/data 89 transmitted by the circuitry 25 of the sensor unit 20. A processing unit 81u, optionally having memory, can be used to process the measurement signals/data 89 received from the sensor unit 20, store the same in the memory, and/or use the communication module 81c to transmit it to external devices/systems (not shown) e.g., long distance (e.g., cellular RF communication, for example, to process/store the measurement signals/data in the cloud or remote cloud gateway).

Figures 9A, 9B:
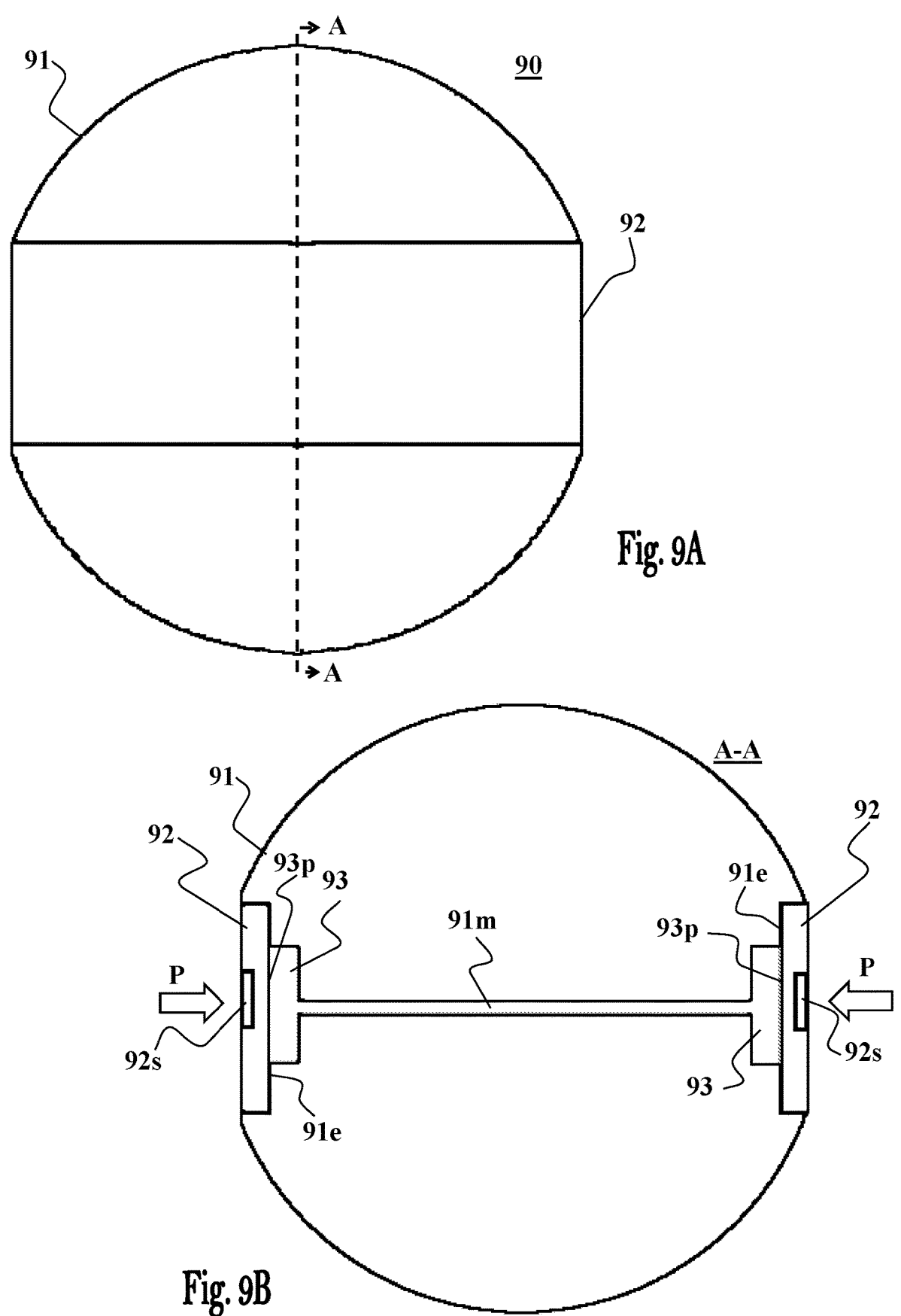

FIGS. 9A and 9B schematically illustrate another sensor application 90 implementing the creep compensation principles disclosed herein. The sensor 90 comprises a non-deformable or deformable body portion 91, and a circumferential deformable portion 92 equipped with one or more sensor elements 92s. In this specific and non-limiting example the non-deformable or deformable body portion 91 is generally of spherical or cylindrical shape, and the circumferential deformable portion 92 is placed in a circumferential channel 91e formed therein. In possible embodiments the body portion 91 is made from a deformable material(s) and configured to serve as the compensation component of the sensor 90.

FIG. 9B shows a section view A-A of the sensor 90. A seen, the sensor 90 comprises a circumferential cavity 93 extending inwardly from the circumferential channel 91e, and the circumferential deformable portion 92 is snugly fitted into the circumferential channel 91e and seals the circumferential opening 93p of the circumferential cavity 93. The one or more sensor elements 92s are placed in or on a section of the deformable portion 92 located over/above the circumferential cavity 93, to thereby cause inward (or outward) deformations therein responsive to external pressure P applied over the deformable portion 92. The one or more sensor elements 92s are configured to sense deformations of the circumferential deformable portion 92 due to externally applied pressure P and generate measurement signals/data indicative thereof.

As further seen in FIG. 9B, the body portion 91 comprises one or more fluid channels 91m passing therethrough to fluidly communicate with the circumferential cavity 93. Optionally, but in some embodiments preferably, the fluid channels 91m is formed by a cross-sectional cut made in the body portion 91. In this configuration the circumferential deformable portion 92, the body portion 91 and the one or more fluid channels 91m formed therein are configured to provide creep compensation by allowing the changes in the volumes of the one or more fluid channels 91m and the circumferential cavity 93 as the body portion 91 is deformed in response the externally applied pressure P. When the pressure P is decreased/removed the body portion 91 restores its undeformed state, thereby restoring the initial internal volumes of the one or more fluid channels 91m and the circumferential cavity 93, thereby also restoring the circumferential deformable portion 92 back to its undeformed state.

In embodiments wherein the body portion 91 is non-deformable only the circumferential deformable portion 92 is deformed in response to the externally applied pressure P, thereby providing the creep compensation effect by the changes consequently obtained in the volume of the circumferential cavity 93.

The sensor 90 can be used for measuring fluids pressures applied inside body lumens, and/or applied by sphincter (ring) muscle. For example, sensors 90 can be used in catheter devices, or as another example, in one or more segments of an endoscope device. The sensor 90 can be enclosed inside hollow housing (e.g., 30h), as described hereinabove with reference to in FIG. 3.

Figure 10A:
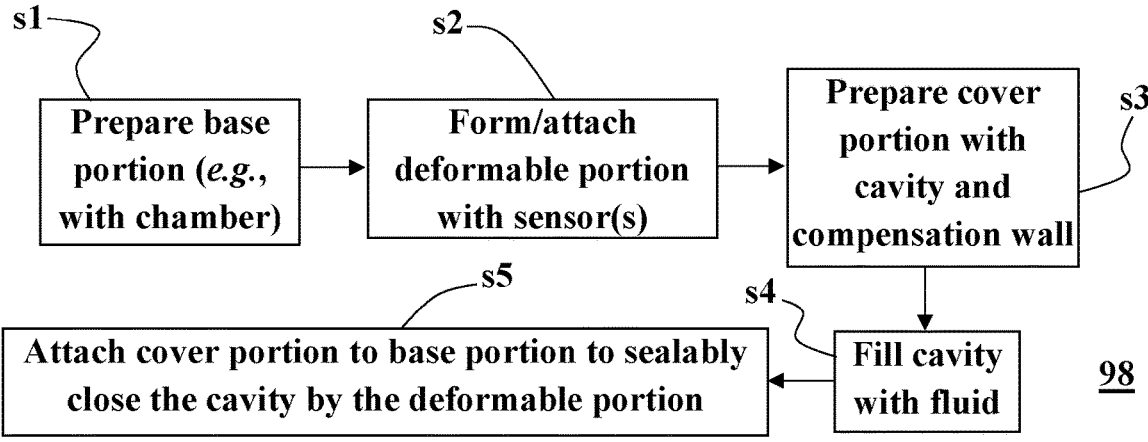
FIGS. 10A and 10B are flowcharts schematically illustrating sensor fabrication processes according to some possible embodiments.

FIG. 10A is a flowchart schematically illustrating a sensor fabrication process 98 according to some possible embodiments. The fabrication process 98 can start (s1) in preparation of the base portion (21 e.g., to include the measurement chamber 21c), and forming/attaching (s2) in the base portion a deformable portion (the sensing layer 24). At the same time, or thereafter, (s3) the cover portion (22) can be prepared with its fluid cell/cavity (22c) and compensation portion (deformable wall section 22d). Next (s4), the fluid cavity/cell (22c) is filled with fluid (e.g., air, liquid and/or any other suitable compressible media). Finally (s5), the cover portion (22) is attached to the base portion (21) so as to sealably close the fluid cavity/cell (22c) of the cover portion (22) by the deformable portion (22d) of the base portion (21).

Figure 10B:
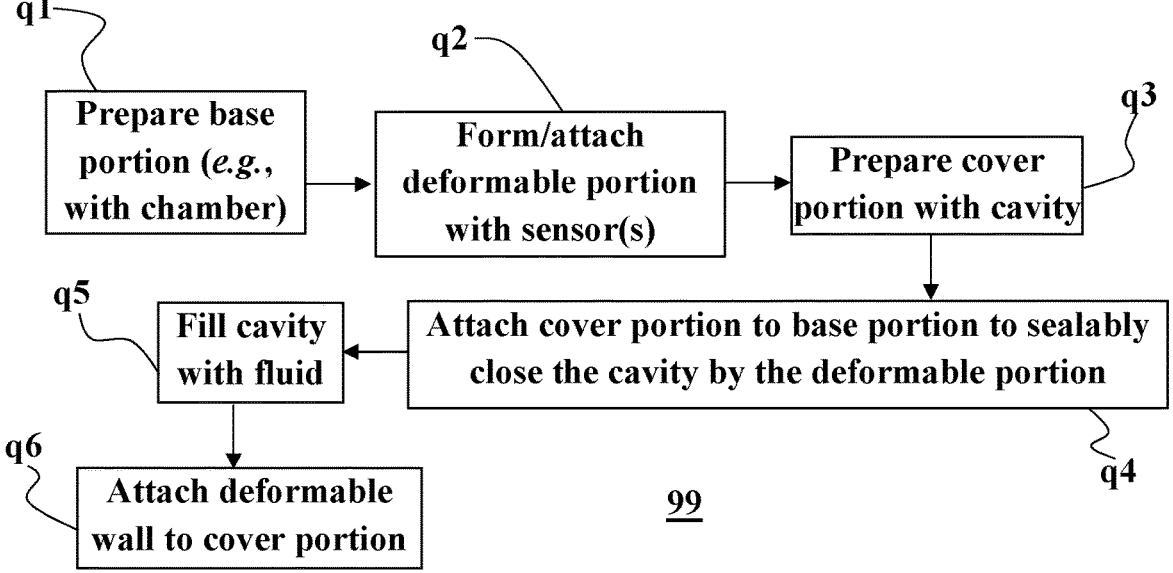

FIG. 10B is a flowchart schematically illustrating a sensor fabrication process 99 according to some possible embodiments. The fabrication process 99 can start (q1) in preparation of the base portion (21 e.g., to include the measurement chamber 21c), and forming/attaching (q2) in the base portion a deformable portion (the sensing layer 24). At the same time, or thereafter, (q3) the cover portion (22) can be prepared with its fluid cell/cavity (22c), but without the compensation portion (deformable wall section 22d) i.e., the fluid cell/cavity (22c) is left open at both sides of the cover portion (22). Next (q4), the cover portion (22) is attached to the base portion (21) e.g., such that the deformable portion (24) partitions between the fluid cavity/cell (21c) of the cover portion (22) and the measurement chamber (21c) of the base portion (21). The fluid cavity/cell (22c) can be then filled (q5) with fluid (e.g., air, liquid and/or any other suitable compressible media), and the deformable wall (22d) can be then (q6) sealably attached to the cover portion to sealably close the fluid cavity/cell (22c).

Terms such as top, bottom, front, back, right, and left and similar adjectives in relation to orientation of the sensor unit/device and its components refer to the manner in which the illustrations are positioned on the paper, not as any limitation to the orientations in which the apparatus can be used in actual applications.

It should also be understood that throughout this disclosure, where a process or method is shown or described, the steps of the method may be performed in any order or simultaneously, unless it is clear from the context that one step depends on another being performed first.

As described hereinabove and shown in the associated figures, the present invention provides creep/deformation compensation mechanism for sensor devices and related methods. While particular embodiments of the invention have been described, it will be understood, however, that the invention is not limited thereto, since modifications may be made by those skilled in the art, particularly in light of the foregoing teachings. As will be appreciated by the skilled person, the invention can be carried out in a great variety of ways, employing more than one technique from those described above, all without exceeding the scope of the claims.

The invention claimed is:

1. A sensor device comprising:
a sealed fluid cell having an internal cavity filled with fluid media, and a compensation portion and a measurement portion configured to interact with said fluid media in response to an externally applied fluid pressure; and
at least one sensor element coupled to said measurement portion of said sealed fluid cell, said compensation and measurement portions configured to deform in response to said externally applied fluid pressure to thereby change internal pressure conditions inside said sealed fluid cell and cause said measurement portion to experience differential pressure conditions corresponding to said external fluid pressure and to an internal pressure inside said sealed fluid cell.

2. The sensor device of claim 1 comprising one or more deformations regulating elements disposed inside the internal cavity of the sealed fluid cell coupled to the compensation portion and configured to achieve a desired relation between the externally applied pressure and the internal pressure inside said sealed fluid cell.

3. The sensor device of claim 1 comprising a hollow enclosure accommodating the sealed fluid cell thereinside, said hollow enclosure having at least one fluid inlet for applying the external fluid pressure to said sealed fluid cell.

4. The sensor device of claim 3 comprising one or more support members configured to couple the sealed fluid cell to an internal wall of said hollow enclosure while enabling said sealed fluid cell to interact with fluid media causing the external fluid pressure, said one or more support members configured to permit fluid passage of the fluid media inside the hollow enclosure.

5. The sensor device of claim 1 wherein the measurement portion comprises a sensing layer having the at least one sensor element in a deformable portion of said sensing layer.

6. The sensor device of claim 5 comprising a base portion configured to define a measurement chamber, wherein the sensing layer is configured to sealably partition between the measurement chamber and the internal cavity of the sealed fluid cell.

7. The sensor device of claim 6 comprising one or more deformations regulating elements disposed inside the measurement chamber coupled to the sensing layer of the measurement portion and configured to achieve a desired relation between the externally applied pressure and the internal pressure inside the sealed fluid cell.

8. The sensor device of claim 6 wherein the measurement chamber is at least partially filled with an intermediating component configured to convey the external fluid pressure into the measurement chamber without direct contact between the sensing layer and a fluid substance affecting said external fluid pressure.

9. The sensor device of claims 5 comprising a cover portion configured to define a cavity of the sealed fluid cell, and wherein an opening of said cavity is sealably closed by said sensing layer, thereby sealably closing the internal cavity of said sealed fluid cell.

10. The sensor device of claim 1 comprising at least one sensor element operably installed inside the internal cavity of the sealed fluid cell and configured to measure at least one property or condition of the fluid media filling said internal cavity.

11. The sensor device of claim 1 comprising at least one of the following: at least one circuitry configured to receive measurement data/signals from said at least one sensor element and transmit data/signals indicative thereof to at least one external device or system; a communication module configured for at least one of the following: (i) power the at least one circuitry; (ii) receive the data/signals transmitted from the at least one circuitry; and/or (iii) communicate the data/signals received from the at least one sensor element to a remote device or system, wherein the communication module is configured to wirelessly power the at least one circuitry and wirelessly receive the data/signals transmitted from the at least one circuitry.

12. The sensor device of claim 1 wherein the sealed fluid cell is defined inside a spherical or cylindrical shaped element having a circumferential channel defining the internal cavity of said sealed fluid cell and at least one portion configured to define the compensation portion, and wherein the measurement portion comprises a circumferential deformable portion sealably covering said circumferential channel.

13. The sensor device of claim 12 comprising one or more fluid channels passing through the spherical or cylindrical shaped element to fluidly communicate with the circumferential cavity.

14. A method of preparing a sensor device, the method comprising forming in a base portion a deformable portion with at least one sensor element, preparing a cover portion to include a cavity and at least one compensation portion deformable towards said cavity, filling said cavity with fluid media and attaching said cover portion to said base portion such that an opening of said cavity is sealably closed by said deformable portion.

15. The method of claim 14 comprising at least one of the following: attaching the cover portion to the base portion without the compensation portion, filling the cavity with the fluid media, and sealing said cavity by attaching the compensation portion to said cover portion;
coupling at least one circuitry to said at least one sensor element; coupling inside the cavity of the cover portion one or more deformations regulating elements to the compensation portion to achieve a desired relation between the externally applied pressure an internal pressure inside said cavity; forming a measurement chamber in said base portion configured to convey external fluid pressure to the deformable portion; coupling inside the measurement chamber one or more deformations regulating elements to the sensing layer of the base portion to achieve a desired relation between the externally applied pressure and an internal pressure inside the cavity of the base portion; at least partially filling the measurement chamber with an intermediating component configured to convey the external fluid pressure into the measurement chamber without establishing direct contact between the sensing layer and a fluid substance affecting said external fluid pressure; placing the cover portion with the base portion attached to it inside a hollow housing having an opening configured to convey the external fluid pressure into said hollow housing to substantially surround said cover and base portions.

16. A method of using the sensor device of claim 15 comprising externally powering the at least one circuitry by an external module and transmitting by said at least one circuitry signals/data produced by the at least one sensor element to said external module.

17. The method of any one of claims claim 14 wherein preparing the cover portion comprises forming a circumferential channel in a spherical or cylindrical shaped element, and the preparing of the base portion comprises placing at least one sensor element to a circumferential deformable portion and sealably covering said circumferential channel with said circumferential deformable portion.

18. The method of claim 17 further comprising forming one or more fluid channels in the spherical or cylindrical shaped element, said one or more fluid channels configured to fluidly communicate with the circumferential cavity.

19. A sensor device comprising: a spherical or cylindrical shaped element having a circumferential channel defining an internal cavity and at least one deformable portion configured to define a compensation portion of said sensor device; and a circumferential deformable portion sealably attached over said circumferential channel to define a sealed fluid cell of a measurement portion of said sensor device.

20. The sensor device of claim 19 comprising one or more fluid channels passing through the spherical or cylindrical shaped element to fluidly communicate with the circumferential cavity.

* * * * *